United States Patent [19]

Arimoto et al.

[11] Patent Number: 4,760,407
[45] Date of Patent: Jul. 26, 1988

[54] LASER PRINTING APPARATUS WITH DEVICE FOR COMBINING A PLURALITY OF OPTICAL BEAMS PROVIDED WITH AN INTEGRAL-ORDER WAVE PLATE

[75] Inventors: Akira Arimoto, Musashimurayama; Susumu Saito, Hachiouji, both of Japan

[73] Assignees: Hitachi Koki Co., Ltd.; Hitachi Ltd., both of Tokyo, Japan

[21] Appl. No.: 81,448

[22] Filed: Aug. 4, 1987

[30] Foreign Application Priority Data

Aug. 8, 1986 [JP] Japan ................... 61-185106

[51] Int. Cl.$^4$ .......................... G01D 9/42; H04N 1/21
[52] U.S. Cl. .................................. 346/108; 346/160; 358/296
[58] Field of Search ................. 346/108, 107 R, 76 L, 346/160; 358/296, 300, 302, 105

[56] References Cited

U.S. PATENT DOCUMENTS 4,686,542  8/1987  Yip ...................................... 358/296

FOREIGN PATENT DOCUMENTS 79216  5/1983  Japan .

OTHER PUBLICATIONS

Collected Drafts of Lectures of the 46th Meeting of Japan Society of Applied Physics, Autumn, 1985, 3P-H-9, p. 63.

Primary Examiner—E. A. Goldberg
Assistant Examiner—Mark Reinhart
Attorney, Agent, or Firm—Antonelli, Terry & Wands

[57] ABSTRACT

A laser printing apparatus having a device for combining optically a plurality of laser lights which combines a plurality of laser lights and in which integral-order wave plates are provided respectively on the optical paths formed between a polarizing prism making part of the combined laser lights branch and sources of emission of said laser lights in a plurality, so that the quantity of said branching lights can be adjusted, and having a mechanism which adjusts and controls a distance between dots of the aforesaid combined output laser beams formed on a photosensitive drum for a laser printer, on the basis of detection outputs of the aforesaid branching lights.

4 Claims, 3 Drawing Sheets

LASER PRINTING APPARATUS WITH DEVICE FOR COMBINING A PLURALITY OF OPTICAL BEAMS PROVIDED WITH AN INTEGRAL-ORDER WAVE PLATE

BACKGROUND OF THE INVENTION

The present invention relates to an optical beam printer apparatus which uses a plurality of optical beams such as laser beams, for instance, and employs an optical beam combining device for using powers of these optical beams effectively.

As is described in Japanese Patent Laid-Open No. 79216/1983 (shown by FIG. 1), for instance, conventional apparatuses employing the aforesaid optical beam combining device use an optical element 3 (called a polarizing prism in general) which is designed to transmit specific linearly-polarized light (called P polarization) and reflect the other linearly-polarized light (called S polarization) vibrating in a plane intersecting perpendicularly to the above light, on the occasion when light beams from two linearly-polarized light sources (e.g. semiconductor lasers) 1 and 2 are to be combined in the same direction substantially. As is illustrated in FIG. 2 which is an enlarged view of a part shown in FIG. 1, it is possible to use two light beams effectively by making lights of P polarization 1P and S polarization 2S fall on the polarizing prism 3 and making the two lights emitted therefrom in the same direction as indicated by numeral 12 in the figure. The apparatus shown in FIG. 1 will be described in more detail in the following.

In the double-beam scanning optical system shown in FIG. 1, one beam is used for a laser printer, while the other is used as an input for reading a copy such as a document. As for a light source, two semiconductor lasers 1 and 2 having polarization characteristics are employed. In relation to a first polarizing prism 3, the semiconductor lasers are so disposed that the planes of polarization thereof are positioned in the directions P and S respectively. Since S polarization is reflected and P polarization is transmitted as described above, the two beams can be combined once into one beam. This combined beam is scanned by a scanning system 4 such as a polygonal mirror and then focused as a small spot on a photosensitive drum 8 or a copy 7 such as a document by means of a focusing optical system 5 such as an Fθ lens. On the occasion, the beams once combined into one are resolved into two beams by a second polarizing prism 6. In this apparatus, the beam of S polarization is reflected by both of the first and second polarizing prisms 3 and 6 to be used as a beam for reading a document. Moreover, there is a laser printer apparatus to be taken as another example in which the polarizing prism is employed to combine light beams as described above. This apparatus is designed to utilize a plurality of optical beams more effectively than conventional ones, and it shows an attempt to reduce by half the power of each laser and the number of revolutions of the polygonal mirror by simultaneously scanning the laser beams obtained in the same direction in such a way as shown previously in FIG. 2 (Collected Drafts of Lectures for The 46th Meeting of JAPAN Society of Applied Physics, autumn, 1985; 3P-H-9, p. 63). The optical system of the above-stated apparatus is as shown in FIG. 3. Concretely, two semiconductor lasers 31P and 31S are employed with the planes of polarization thereof made to intersect each other perpendicularly, two laser beams are combined and outputted in the same direction by a polarizing prism 33, and these two laser beams are made to scan synchronously. In order to maintain space spots obtained from two laser beams in the sub-scanning direction at a prescribed value, on the occasion, parts of light beams combined by said polarizing prism 33 are led out to a photodetector 39 for detecting a spot spacing so as to control the mutual spacing of the spots of these two laser beams. Said photodetector is composed of two sets of divided-in-two detecting elements or one set of divided-in-four detecting elements which are designed, as shown in FIG. 3, to be irradiated by two leakage light beams 39-1 and 39-2 led out as described above and corresponding to the elements respectively.

It is important particularly in such an apparatus as described above to adjust a balance in a quantity of light between a light led to a photosensitive drum 38 and a light led to the photodetector 39, via a polygonal mirror 34. There occur such practical disadvantages that the power of an optical beam for printing becomes insufficient when an output onto said photodetector side is too large, and that the detecting capacity of the detector turns insufficient when it is too small. The quantity of light of the optical beam for detection as preferably about 5% in general.

In FIG. 3, marks DA1 and DA2 denote differential amplifiers which obtain differential outputs (A1−A2) and (A3−A4) of the aforesaid detector respectively, numeral 30 a controller which controls galvanomirrors GM1 and GM2 on the basis of the outputs of said differential amplifiers, and BD a beam detector for printing 30 a cylinder lens.

Since the polarizing prism 33 transmits P polarization and reflects S polarization, an adjustment is required to lead parts of two linearly-polarized laser beams to the photodetector by rotating the respective light-emitting surfaces of the semiconductor lasers (by inclining the respective planes of polarization of emission thereof) generally.

However, the conventional method wherein the very light-emitting surface of a laser light source is rotated to incline the plane of polarization so as to adjust the quantity of light of laser beams has the following disadvantage. The cross section of an optical beam emitted from a semiconductor laser, a source of emission of a laser light, is elliptic generally, and the elliptic cross section of the optical beam is rotated with the rotation of the aforesaid light-emitting surface. This causes a problem that the shape of a focused laser beam spot is varied with the rotation. This causes a further problem that, in a laser printer apparatus, for instance, a spacing between scanning lines is varied from a prescribed one with a change in the shape of spots of printing beams adjacent to each other, which results in such a disadvantage as blurring of a print or the like.

SUMMARY OF THE INVENTION

Solving problems as described above, the present invention enables the attainment of a desired clear print. For this purpose, in the present invention, an integral order wave plate is put in an optical path between a laser light source and a polarizing prism, and said wave plate is rotated to adjust the quantity of light to a desired one without taking such a method as the rotation of the light-emitting surface of the laser light source, thus enabling the solution of the prior-art problems by a relatively simple construction.

BRIEF DESCRIPTION OF THE DRAWINGS

FIG. 1 illustrates examples of a laser printer using a conventional optical beam combining device and of an input device thereof for reading a document or the like;

DETAILED DESCRIPTION OF THE PREFERRED EMBODIMENT

In an integral-order wave plate, in general, the phase difference of the respective two polarized components of transmitted light intersecting each other perpendicularly are represented by $n \times 2\pi$ (n: an integer), on condition that the orientation of a set crystal axis is normal. Therefore, the polarized state of the light is kept as it is before the transmission, even after the light is transmitted, as if nothing occurred there.

When the direction of the wave plate is turned round (in other words, when the crystal axis of the wave plate is turned round), however, the phase difference between two polarized lights transmitted therethrough is varied from a value being integral m times larger than $2\pi$, as represented by $$n \times 2m\pi - \delta \qquad (1),$$

since the crystal axis is shifted. Mark $\delta$ denotes a value of variation from the aforesaid phase difference.

When a linearly-polarized light is incident, accordingly, the light outputted from the plate is an elliptically-polarized light having such a phase difference as represented by $$\left. \begin{array}{l} A_{45°} = \sin \omega t \\ A_{-45°} = \sin (\omega t - \delta) \end{array} \right\}, \qquad (2)$$

where $A_{45°}$ denotes the 45° direction component from the holizontal axis of the polarized light and $A_{-45°}$ the $-45°$ direction component thereof.

This means that the light vibrates also in the direction intersecting perpendicularly to said vertical component by a value corresponding to the value $\delta$. It is made possible thereby to control freely the ratio between the quantity of light entering a photodetector for controlling the spot of an optical beam and the quantity of light directed toward a photosensitive drum through a polygonal mirror and others.

When the linearly-polarized light is converted into the elliptically-polarized light before the incidence in a polarizing prism by shifting an optical path difference from a value being integral times larger than that of a given wavelength as described above by a method wherein the wave plate (so-called an integral-order wave plate) which generates an optical path difference having a wavelength larger by integral times at a prescribed set angle is rotated from the set angle, light beams which are naturally made only to be transmitted or reflected in the case of the above-stated linear polarization are to have a property of being reflected partly in the former case or being transmitted partly in the latter when they are converted into the elliptically-polarized beams, and thus it turns possible to change arbitrarily the ratio in the quantity of light of the transmitted or reflected beams of the aforesaid output light of the polarizing prism.

The present invention will be described hereunder with reference to an embodiment.

Figure 1:
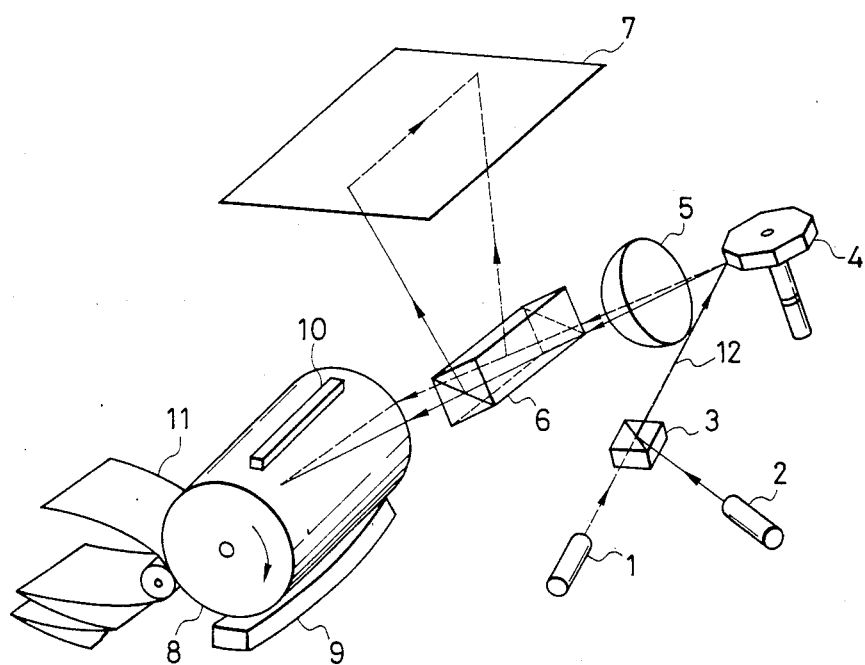
Figure 2:
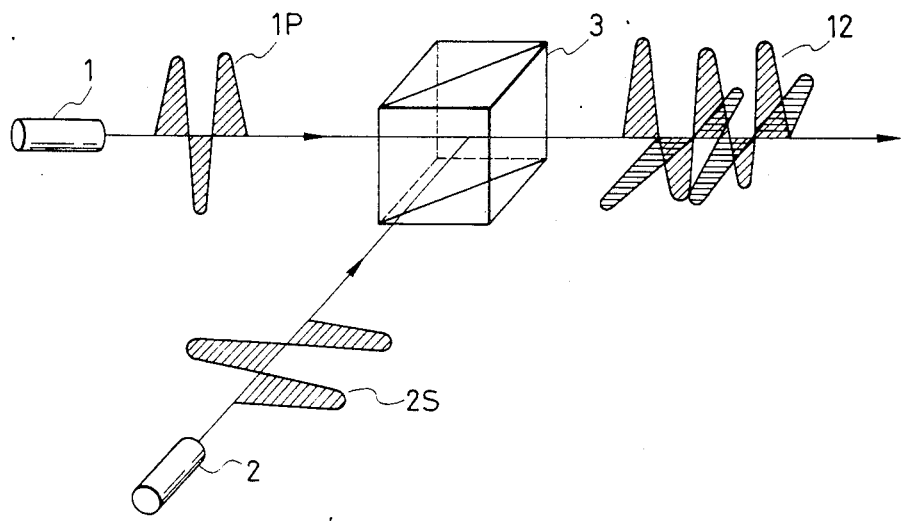
FIG. 2 illustrates an operation of the principal part of the conventional optical beam combining device.
Figure 3:
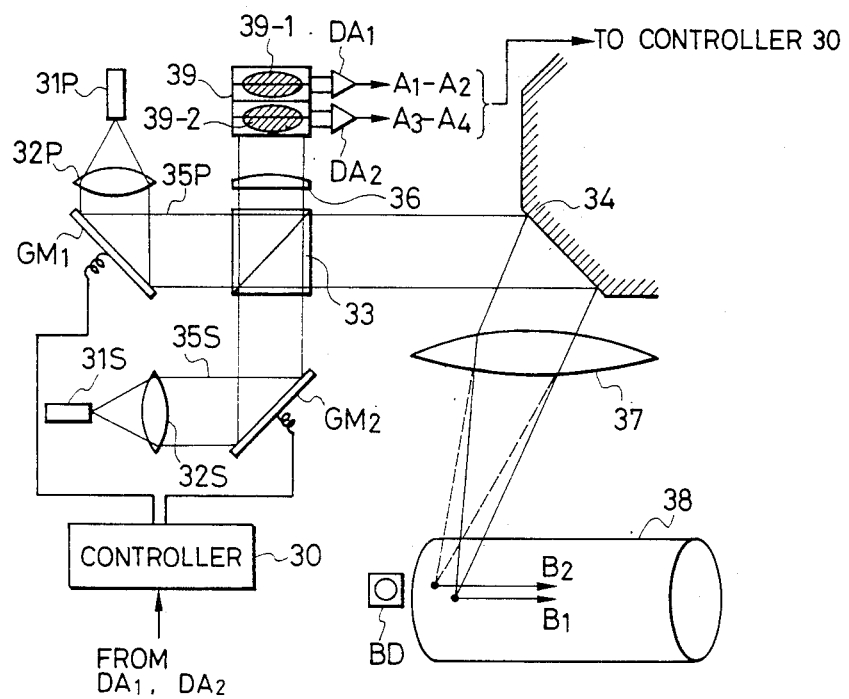
FIG. 3 illustrates an example of a laser printer apparatus based on a plurality of beams and using the conventional optical beam combining device.
Figure 4:
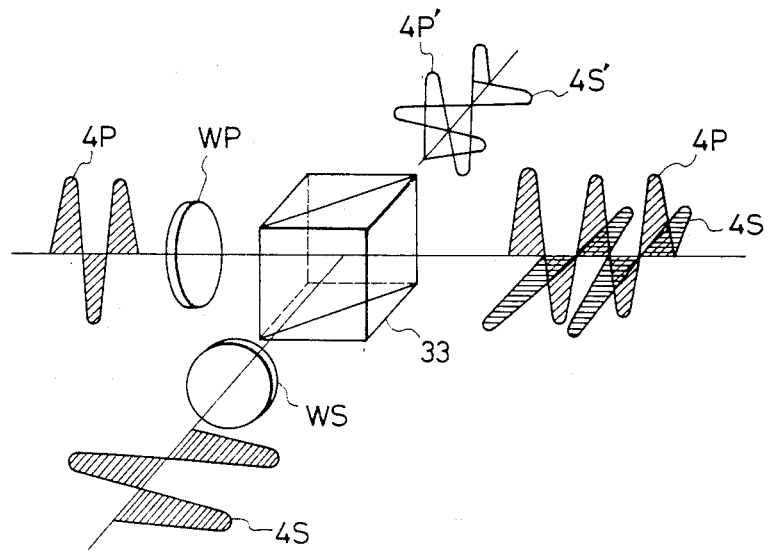
FIG. 4 illustrates the construction of an optical beam combining device constituting the principal part of the present invention and the operation thereof.
Figure 5:
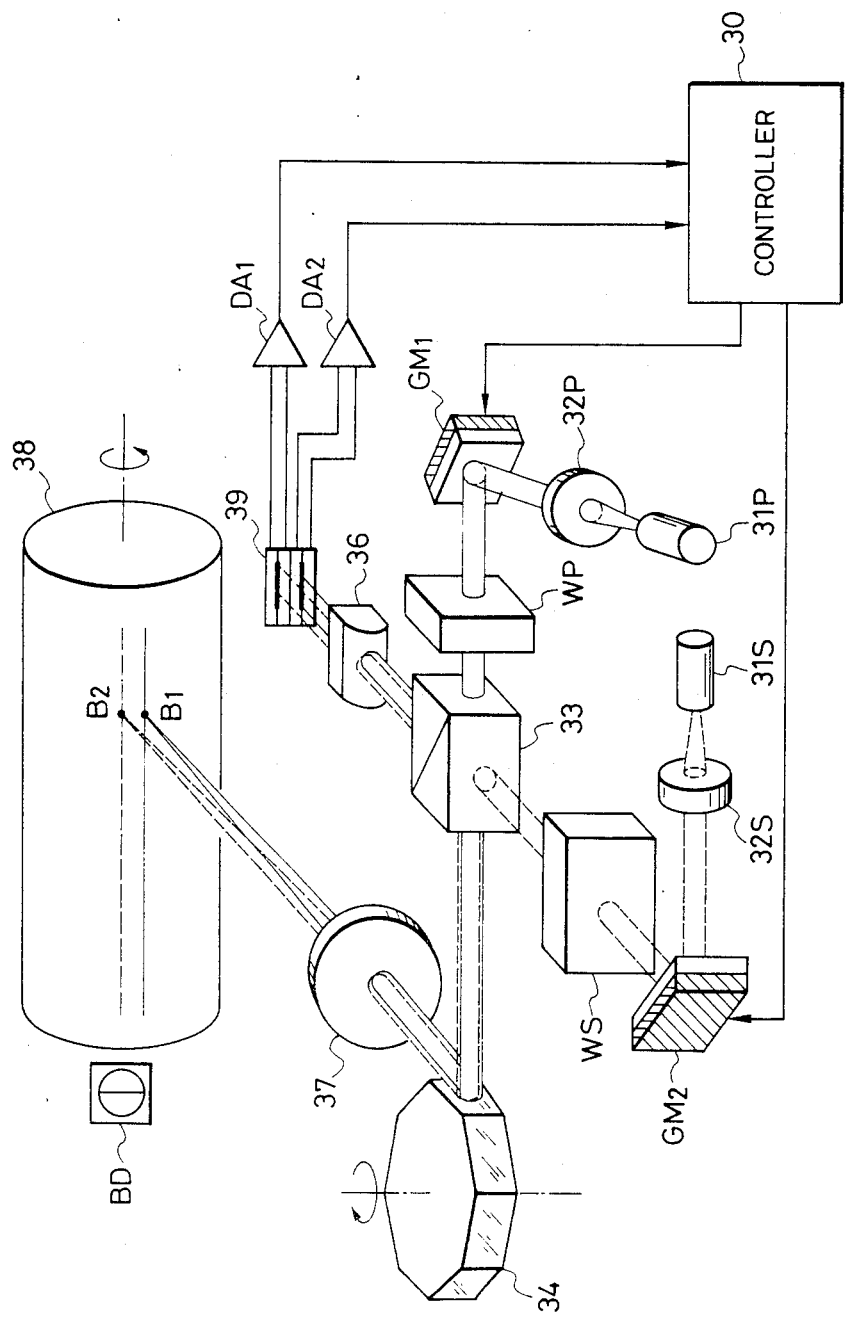
FIG. 5 illustrates one embodiment of a laser printer apparatus based on a plurality of beams and using the optical beam combining device of the present invention.

FIG. 4 and FIG. 5 show the principal part of the present invention and one embodiment thereof. Two polarized lights of P polarization 4P and S polarization 4S intersecting each other perpendicularly are made to enter a polarizing prism 33. This polarizing prism 33 has a property of transmitting P polarization 4P at 100% substantially and reflecting S polarization 4S. When such lights as 4P and 4S are made to enter this polarizing prism 33, optical beams combined in the same direction come out of it as shown by 4P and 4S. According to this construction, an optical beam having twice as large intensity as a single optical beam can be formed. The characteristic feature of the present invention is to insert integral-order wave plates WP and WS in the respective optical paths of incident light beams. Since the integral-order wave plates (e.g. 1-order wave plates) are inserted, no variation is caused naturally in the intensity of the outputted beams 4P and 4S, and such leakage light as 4P' and 4S' should not occur. However, the rotation of these wave plates from prescribed positions means that they are disposed with the crystal axes shifted, and consequently they fail to play a role as the integral-order wave plate.

Accordingly, leakage lights of 4P' and 4S' can be made to occur. The quantity of the leakage light is dependent on the amount of a rotational angle of the wave plate, and thereby an arbitrary quantity of leakage light can be taken out of an incident light beam.

Now, a description will be made on a laser beam printer wherein such an optical beam combining device as stated above is used. The construction illustrated in FIG. 5 is referred to herein. Laser lights 35P and 35S emitted from the two semiconductor lasers 31P and 31S are turned into parallel lights by lenses 32P and 32S and then made to enter the polarizing prism 33. In the path before 33, wave plates WP and WS are disposed. When the angle of disposition of the wave plate is varied by rotation, leakage light is caused to occur, and it enters a detector 39 for detecting a position. Most of light beams are focused as spots B1 and B2 on a photosensitive drum via a rotary polygonal mirror 34 and an F$\theta$ lens 37, and thus two laser light beams are scanned simultaneously by using one facet of the rotary polygonal mirror 34. On the occasion, leakage lights 39-1 and 39-2 are used for maintaining the spacing between the scanning lines of the two laser spots B1 and B2, i.e. the spacing between sub-scanning directions, at a prescribed value. These leakage lights are made to enter the detector 39, and based on a balance of a difference $(A_1 - A_2)$ in the quantity of light, which is outputted from the detector 39 in response to the leakage light 39-1, and on a balance of a difference $(A_3 - A_4)$ in the quantity of light, which is outputted also from the detector 39 in response to the leakage light 39-2, a control is made to drive galvanomirrors GM1 and GM2 so that the positional relationships thereof be controlled to attain $A_1 - A_2 = 0$ and $A_3 - A_4 = 0$. Marks $A_1$, $A_2$, $A_3$ and $A_4$ denote the quantity of light of an optical output signal obtained from the divided-in-four detector respectively. When the position of this photodetector and the spots B1 and B2 formed on a scanning plane are put in a geometrically conjugate relationship, the spacing between the spots on the scanning plane can be set also at a prescribed value by monitoring the spots on the photodetector 39.

By inserting the integral-order wave plate in the optical path of a polarized optical beam which is made to enter a polarizing prism, and by varying the set angle thereof, as described above, the quantity of light of combined beams and that of leakage light can be varied arbitrarily, which enables the excellent adjustment not involving a change in the shape of a spot, as compared with the conventional method wherein the quantity of light is adjusted by turning round the disposition of a light source.

While the example related to laser light as a plurality of optical beams is mentioned in the above description, the present invention can be embodied also for optical beams having properties equivalent thereto, and it is effective in particular for semiconductor laser light, because of its easiness for handling.

What is claimed is:

1. A laser printing apparatus with device for combining a plurality of optical beam provided with an integral-order wave plate comprising;
    optical devices polarizing a plurality of said optical beams for scanning respectively,
    a drum for a printer scanned in a synchronous and parallel manner by spots of said polarized optical beams in a plurality, and
    an optical element transmitting the bundle of rays of first linearly-polarized light while reflecting the bundle of rays of second linearly-polarized light, out of the bundles of rays of said first and second linearly-polarized having linear polarizations lights intersecting each other perpendicularly and
    in which the aforesaid optical beams in a plurality are combined by the aforesaid optical element and outputted therefrom to form spots of the optical beams for the printer,
    an optical beam printer apparatus using a means of combining a plurality of beams provided with integral-order wave plates, which has a construction wherein each of the integral-order wave plates is interposed in a position of an optical path along which an output light of each of sources of emission of said optical beams in a plurality is inputted to the aforesaid optical element.

2. A laser printing apparatus with device for combining a plurality of optical beam provided with an integral-order wave plate as claimed in claim 1, which employs laser light sources as the sources of emission of the aforesaid optical beams in a plurality.

3. A laser printing apparatus with device for combining a plurality of optical beam provided with an integral-order wave plate claimed as claim 1, which employes semiconductor laser light sources as the sources of emission of the aforesaid optical beams in a plurality.

4. A laser printing apparatus with device for combining a plurality of optical beam provided with an integral-order wave plate claimed as claim 1, 2 or 3, which is provided with means to use part of an output of the aforesaid optical element to detect the mutual spacing between spots of the optical beams for the aforesaid printer, and to adjust the spacing between said spots on the basis of a detection output thus obtained.

* * * * *